United States Patent
Durand

(10) Patent No.: US 6,408,515 B1
(45) Date of Patent: Jun. 25, 2002

(54) METHOD FOR MANUFACTURING AN ENGINE CRADLE FOR A VEHICLE FRAME ASSEMBLY

(75) Inventor: Robert D. Durand, Wyomissing, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/137,326

(22) Filed: Aug. 20, 1998

(51) Int. Cl.[7] .............................................. B21D 53/88
(52) U.S. Cl. ..................... 29/897.2; 29/421.1; 29/507; 29/518; 180/312; 280/785
(58) Field of Search ................ 219/603, 617, 219/611; 29/897.2, 897, 508, 506, 523, 518, 516, 520, 421.1, 525.14; 296/209, 205, 194, 204; 72/58, 61; 280/785, 781; 180/311, 312

(56) References Cited

U.S. PATENT DOCUMENTS

| | | | |
|---|---|---|---|
| 1,517,238 A | * 11/1924 | Stresau ...................... 29/897.2 |
| 2,817,557 A | 12/1957 | Reynolds |
| 3,913,696 A | 10/1975 | Kennedy et al. |
| 4,063,208 A | * 12/1977 | Bernatt ........................ 337/248 |
| 4,150,274 A | * 4/1979 | Minin et al. .................. 219/8.5 |
| 4,263,980 A | 4/1981 | Harlow, Jr. et al. |
| 4,504,714 A | * 3/1985 | Katzenstein ................ 219/9.5 |
| 4,723,791 A | 2/1988 | Miura et al. |
| 4,753,315 A | 6/1988 | Fujisaki et al. |
| 4,817,986 A | 4/1989 | Kanazawa et al. |
| 4,899,843 A | 2/1990 | Takano et al. |
| 5,035,296 A | 7/1991 | Sjostrand |
| 5,074,374 A | 12/1991 | Ohtake et al. |
| 5,203,194 A | * 4/1993 | Marquardt .................. 29/897.2 |
| 5,267,630 A | 12/1993 | Watanabe et al. |
| 5,322,208 A | * 6/1994 | Hinrichs et al. ........... 29/897.2 |
| 5,324,133 A | * 6/1994 | Kreis et al. ................. 29/897.2 |
| 5,332,281 A | * 7/1994 | Janotik et al. .............. 296/209 |
| 5,435,110 A | * 7/1995 | Stol et al. ................... 52/655.1 |
| 5,487,219 A | * 1/1996 | Ruehl et al. ................ 29/897.2 |
| 5,491,883 A | * 2/1996 | Marlinga .................... 29/421.1 |
| 5,557,961 A | * 9/1996 | Ni et al. ..................... 29/421.1 |
| 5,561,902 A | * 10/1996 | Jacobs et al. ............... 29/897.2 |
| 5,603,581 A | * 2/1997 | Fujita et al. ................ 29/897.2 |
| 5,720,092 A | * 2/1998 | Ni et al. ..................... 29/421.1 |
| 5,794,398 A | * 8/1998 | Kaehlet et al. ............. 29/897.2 |
| 5,829,219 A | * 11/1998 | Sugawara et al. .......... 29/897.2 |
| 5,862,877 A | * 1/1999 | Horton et al. .............. 29/421.1 |
| 5,882,039 A | * 3/1999 | Beckman et al. ........... 280/781 |
| 5,884,722 A | * 3/1999 | Durand et al. |
| 6,076,625 A | * 6/2000 | Matt et al. .................. 180/312 |
| 6,120,059 A | * 9/2000 | Beckman |

* cited by examiner

Primary Examiner—S. Thomas Hughes
Assistant Examiner—T. Nguyen
(74) Attorney, Agent, or Firm—MacMillan, Sobanski & Todd, LLC

(57) ABSTRACT

A method for manufacturing an engine cradle for use with a vehicular body and frame assembly includes the initial step of selecting desired materials for each of four hollow members that will be secured together to form the engine cradle. The selected materials can include metallic materials, such as steel, aluminum, magnesium, and non-metallic materials, such as fiber and other composites, or any combination thereof. The selected materials are formed into desired shapes using any known method, such as by hydroforming. Then, portions of the four members are disposed in a telescoping relationship with one another, such as by providing protrusions on some of the components and disposing the ends of the other components in a telescoping relationship with such protrusions. Lastly, the telescoping portions of the members are secured together using any securement method, including laser, MIG, or electromagnetic pulse welding techniques and adhesive bonding.

11 Claims, 3 Drawing Sheets

METHOD FOR MANUFACTURING AN ENGINE CRADLE FOR A VEHICLE FRAME ASSEMBLY

BACKGROUND OF THE INVENTION

This invention relates in general to body and frame assemblies for vehicles. More specifically, this invention relates to an improved method for manufacturing an engine cradle for use with such a vehicular body and frame assembly.

Virtually all land vehicles in common use, such as automobiles, vans, and trucks, include a body and frame assembly which is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modem vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modern vehicles, such as automobiles and minivans.

In both types of body and frame assemblies, it is known to provide a specialized structure for supporting the engine of the vehicle thereon. This engine support structure, which is commonly referred to as an engine cradle, is frequently embodied as a generally U-shaped member having a central portion and a pair of leg portions. Engine mount portions and body mount portions are formed at various locations on the engine cradle. The engine mount portions are provided for facilitating the connection of the engine to the engine cradle, while the body mount portions are provided for facilitating the connection of the engine cradle to the body and frame assembly. Usually, bolts or similar fasteners are used to provide the various connections between the engine, the engine cradle, and the body and frame assembly. Thus, the engine cradle securely supports the engine on the body and frame assembly of the vehicle during use.

In the past, engine cradles were usually formed by stamping a number of flat metallic components into desired configurations and securing the stamped components together, such as by welding. Engine cradles of this general type have been found to be effective, but are relatively time consuming and expensive to manufacture because they involve the manufacture and handling of a relatively large number of individual components. More recently, engine cradles have been formed from a single tubular member using the process of hydroforming. Hydroforming is an advantageous process for forming engine cradles and other structures because it can quickly deform a single component into a desired shape. To accomplish this, the tubular member was initially pre-bent in a tube bending apparatus to a desired preliminary shape. Then, the pre-bent tube was disposed between two die sections of a hydroforming apparatus which, when closed together, defined a die cavity having a desired final shape. Thereafter, the tubular member was filled with a pressurized fluid, typically a relatively incompressible liquid such as water. The pressure of the fluid was increased to a magnitude where the tubular member was deformed into conformance with the die cavity and, thus, the desired final shape.

Although hydroforming has been found to be effective to reduce manufacturing time and complexity by minimizing the number of components and eliminating the securement of the various components together, it has the inherent drawback that only a single piece of material can be used to form the engine cradle. Thus, the size, shape, and composition of the piece of material must be selected to satisfy all of the design requirements throughout the entire engine cradle. As a result, one or more locations of the hydroformed engine cradle may be formed having a size, shape, or composition that exceeds the design requirements at those locations. This can result in undesirable addition of weight or cost to the overall engine cradle. Thus, it would be desirable to provide an improved method for manufacturing an engine cradle that incorporates the advantages of hydroforming, while allowing the use of alternative materials to form different portions of the engine cradle.

SUMMARY OF THE INVENTION

This invention relates to an improved method for manufacturing an engine cradle for use with a vehicular body and frame assembly. Initially, desired materials are selected for each of four hollow members that will be secured together to form the engine cradle. The selected materials can include metallic materials, such as steel, aluminum, magnesium, and non-metallic materials, such as fiber and other composites, or any combination thereof The selected materials are formed into desired shapes using any known method, such as by hydroforming. Then, portions of the four members are disposed in a telescoping relationship with one another, such as by providing protrusions on some of the components and disposing the ends of the other components in a telescoping relationship with such protrusions. Lastly, the telescoping portions of the members are secured together using any securement 9 method, including laser, MIG, or electromagnetic pulse welding techniques and adhesive bonding.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
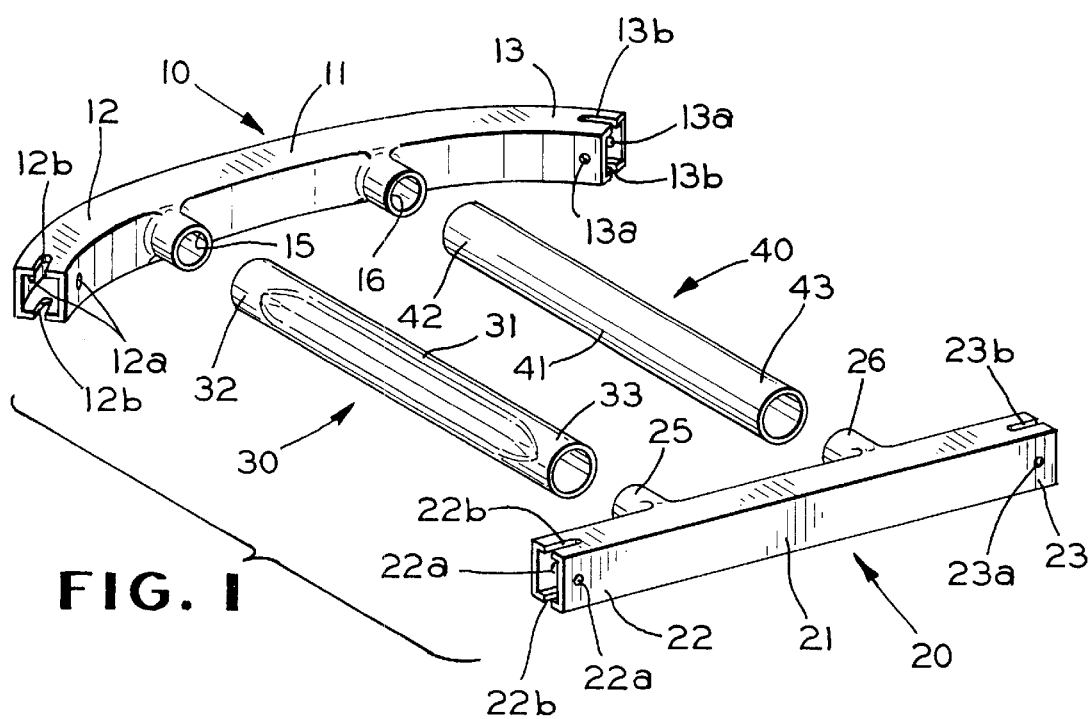
FIG. 1 is an exploded perspective view of four components used to manufacture an engine cradle in accordance with the method of this invention.

Referring now to the drawings, there is illustrated in FIG. 1 an exploded perspective view of four members, indicated generally at 10, 20, 30, and 40, used to manufacture an engine cradle in accordance with the method of this invention. For the sake of illustration, the four members will be referred to as the front end member 10, the rear end member 20, the left side member 30, and the right side member 40. However, it will be appreciated that these terms, as well as other terms of reference employed herein, are used only to facilitate the understanding of this invention and are not intended to limit the scope of this invention.

The front end member 10 is a hollow component including a central portion 11 and a pair of end portions 12 and 13. The illustrated central portion 11 extends generally linearly and has a generally rectangular cross sectional shape. The illustrated end portions 12 and 13 are curved relative to the central portion 11 and also have a generally rectangular cross sectional shape. However, the front end member 10 may be formed having any desired shape. The illustrated end portions 12 and 13 are formed having apertures 12$a$ and 13$a$ and slots 12$b$ and 13$b$ formed therein to facilitate the mounting of a portion of the vehicle body (not shown) or other component of the vehicle on the front end member 10. However, the front member 10 may be formed having any conventional mounting structure formed therein or secured thereto, either on the end portions 12 and 13 or on the central portion 11. Alternatively, the front end member 10 may be formed having no such mounting structure whatsoever if desired. A pair of rearwardly extending protrusions 15 and 16 are formed on the central portion 11 of the front end member 10. The protrusions 15 and 16 are generally hollow and cylindrical in shape, each defining an inner diameter and an outer diameter, and are formed integrally with the central portion 11. The protrusions 15 and 16 may, however, be formed integrally with either or both of the end portions 12 and 13.

The rear end member 20 is also a hollow component including a central portion 21 and a pair of end portions 22 and 23. The illustrated central portion 21 extends generally linearly and has a generally rectangular cross sectional shape. The illustrated end portions 22 and 23 extend generally linearly relative to the central portion 21 and also have a generally rectangular cross sectional shape. However, the rear end member 20 may be formed having any desired shape. The illustrated end portions 22 and 23 are formed having apertures 22$a$ and 23$a$ and slots 22$b$ and 23$b$ formed therein to facilitate the mounting of a portion of the vehicle body(not shown) or other component of the vehicle on the rear end member 20. However, the rear member 20 may be formed having any conventional mounting structure formed therein or secured thereto, either on the end portions 22 and 23 or on the central portion 21. Alternatively, the rear end member 20 may be formed having no such mounting structure whatsoever if desired. A pair of forwardly extending protrusions 25 and 26 are formed on the central portion 21 of the rear end member 20. The protrusions 25 and 26 are generally hollow and cylindrical in shape, each defining an inner diameter and an outer diameter, and are formed integrally with the central portion 21. The protrusions and 26 may, however, be formed integrally with either or both of the end portions 22 and 23.

The left side member 30 is also a hollow component including a central portion 31 and a pair of end portions 32 and 33. The illustrated central portion 31 extends generally linearly and has a generally hollow-L cross sectional shape. The illustrated end portions 32 and 33 extend generally linearly relative to the central portion 31 and have a generally circular cross sectional shape. However, the left side member 30 may be formed having any desired shape. Each of the end portions 32 and 33 defines an inner diameter and an outer diameter. Similarly, the right side member 40 is also a hollow component including a central portion 41 and a pair of end portions 42 and 43. The illustrated central portion 41 extends generally linearly and has a generally hollow-L cross sectional shape. The illustrated end portions 42 and 43 extend generally linearly relative to the central portion 41 and have a generally circular cross sectional-shape. However, the right side member 40 may be formed having any desired shape. Each of the end portions 42 and 43 defines an inner diameter and an outer diameter.

Some or all of the four members 10, 20, 30, and 40 may be formed from differing materials. For example, the front and rear end members 10 and 20 may be formed from steel, while the left and right side members 30 and 40 may be formed from alternative materials, such as aluminum, magnesium, fiber and other composites, and the like. The selection of the materials used to form the four members 10, 20, 30, and 40 can be varied to accommodate the design requirements of the engine cradle to be formed. Ideally, the materials selected for use in each of the components will optimize the design thereof based upon various design criteria, including, for example, strength, durability, weight, cost, and the like.

Figure 2:
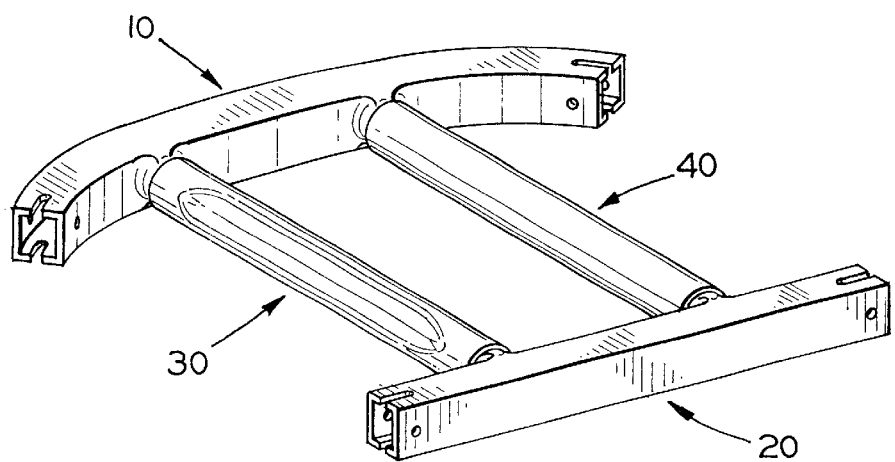
FIG. 2 is a perspective view of the four components illustrated in FIG. 1 after assembly to form the engine cradle.
Figure 3:
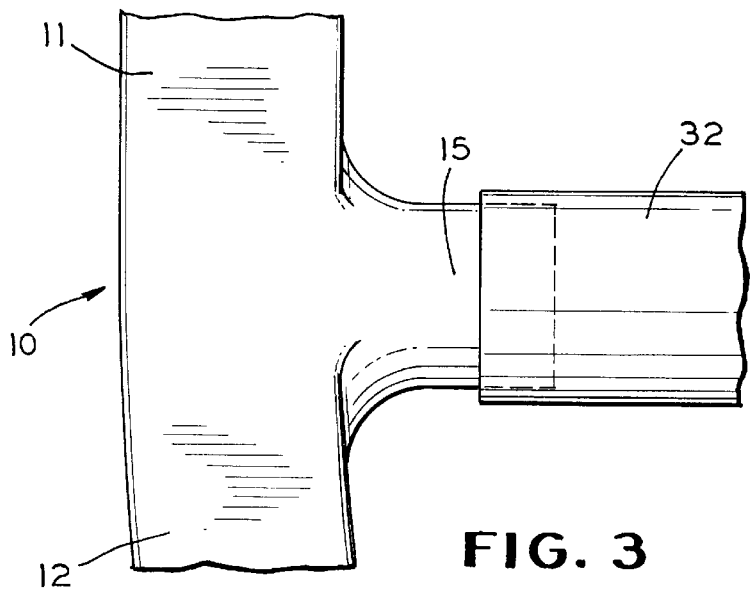
FIG. 3 is an enlarged top plan view of an assembled node between two of the components illustrated in FIG. 2.

FIG. 2 is a perspective view of the four components 10, 20, 30, and 40 illustrated in FIG. 1 after assembly to form an engine cradle. As shown therein, the engine cradle is formed by disposing the protrusions 15 and 16 of the front end member 10 in a telescoping relationship relative to the front end portions 32 and 42 of the left and right side members 30 and 40, respectively, and further by disposing the protrusions 25 and 26 of the rear end member 20 in a telescoping relationship relative to the rear end portions 33 and 43 of the left and right side members 30 and 40, respectively. FIG. 3 illustrates in detail the assembled node between rearwardly extending protrusion 15 formed on the front end member 10 and the forward end 31 of the left side member 30. As shown therein, the inner diameter defined by the forward end 32 is slightly larger than the outer diameter defined by the rearwardly extending protrusion 15. Thus, the forward end 32 of the left side member 30 is disposed telescopically about the rearwardly extending protrusion 15 of the front end member 10. It will be appreciated, however, that the forward end 32 of the left side member 30 could be disposed telescopically within the rearwardly extending protrusion 15 of he front end member 10 if desired.

The telescoping portions of the four components 10, 20, 30, and 40 can be secured together by several different methods. For example, welding can be used to secure the forward end 32 of the left side member 30 to the rearwardly extending protrusion 15 of the front end member 10 if the two members are formed from the same (or at least compatible) metallic materials. Such welding can be accomplished by well known laser, MIG, or electromagnetic pulse welding techniques. Alternatively, any one of a well known number of adhesives may be used to secure the two members together. If adhesive bonding is used, it may be desirable to mechanically stake the two members together to temporarily retain them in a desired telescoping relationship until the adhesive is sufficiently cured. Such staking can be accomplished by well known mechanical deformation or ultrasonic staking techniques. It will be appreciated that this invention contemplates that any other method of securing the telescoping portions can be used, and further that different methods may be used to secure different nodes within a given engine cradle structure.

Figure 4:
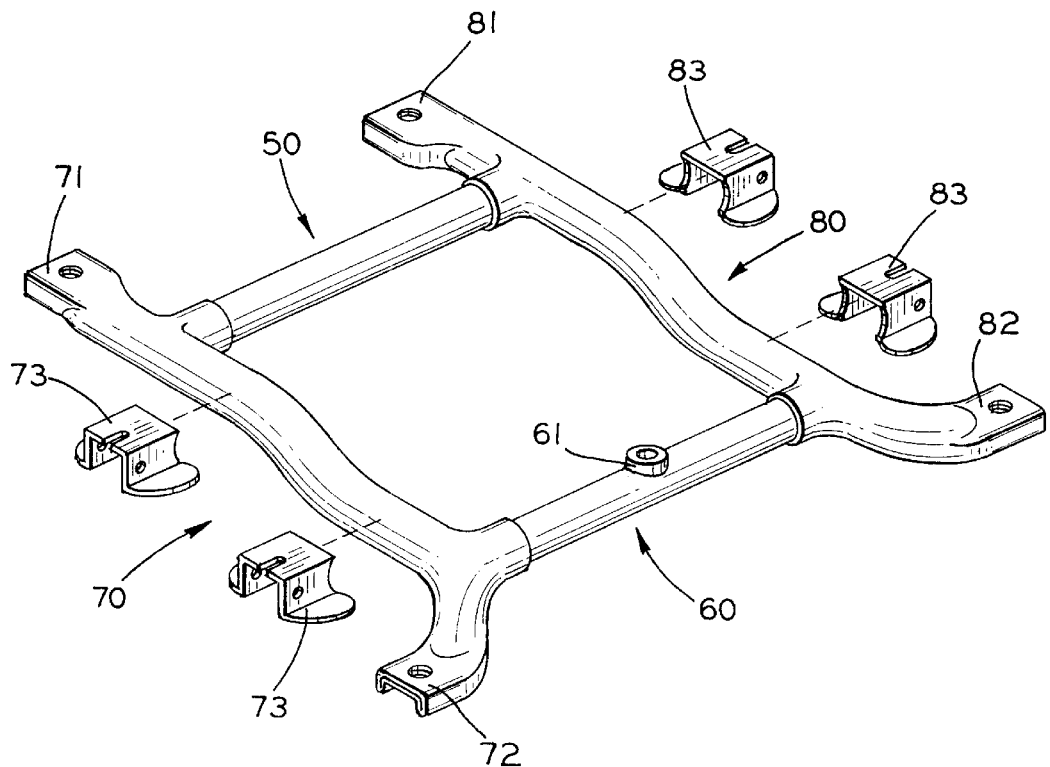
FIG. 4 is an enlarged perspective view showing an alternative embodiment of a portion of the engine cradle illustrated in FIGS. 1 and 2.

FIG. 4 illustrates and alternative embodiment of the engine cradle illustrated in FIGS. 1, 2, and 3. As shown therein, the engine cradle includes a front end member 50, a rear end member 60, and left side member 70, and a right side member 80. In this embodiment, the front and rear end members 50 and 60 extend between the left and right side members 70 and 80, as opposed to the earlier embodiment wherein the left and right side members 30 and 40 extended between the front and rear end members and 20. The left and right side members 70 and 80 have respective end portions 71, 72 and 81, 82 that are flattened and bent to provide a generally U-shaped double wall thickness, and each is further has an opening formed therethrough. These end portions are provided to facilitate the mounting of a portion of the vehicle body (not shown) or other component of the vehicle thereon. Also, one or more brackets 73 and 83 may be attached to the left and right side members 70 and 80 to facilitate the mounting of such vehicle body portions thereon. Lastly, one or more mounting pads, such as the steering gear assembly mounting pad 61 formed on the rear end member 60, may be formed on one or more of the four members 50, 60, 70, and 80 to facilitate the mounting of such vehicle body portions thereon.

Figure 5:
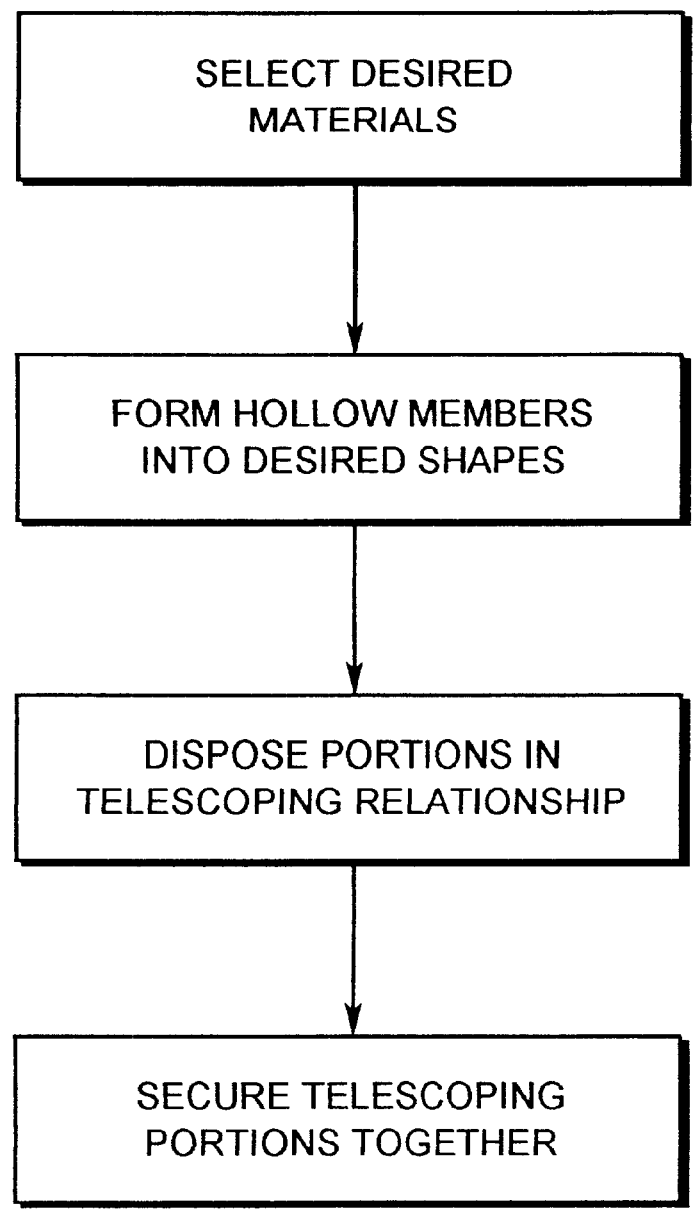
FIG. 5 is a flow chart illustrating the steps in the method of manufacturing the engine cradle illustrated in FIGS. 1, 2, and 3.

FIG. 5 is a flow chart illustrating the steps in the method of manufacturing the engine cradle in accordance with this invention. Initially, the desired materials for the four members to form the engine cradle are selected and formed having desired shapes. The four members are preferably formed into desired shapes using hydroforming techniques when they are formed from metallic materials. However, any method may be used to provide the hollow members with the desired shapes. Then, portions of the four members are disposed in a telescoping relationship with one another. As discussed above, this step can be accomplished by forming protrusions on some of the components and disposing the ends of the other components in a telescoping relationship with such protrusions, such as shown in FIGS. 2 and 4. Lastly, the telescoping portions of the members are secured together using any one or more of the above-discussed securement methods.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for manufacturing a combined engine cradle and vehicular body and frame assembly comprising the steps of:

(a) providing four hollow members including a front end member having a pair of rearwardly extending protrusions, a rear end member having a pair of forwardly extending protrusions, a left side member having a front end and a rear end, and a right side member having a front end and a rear end, at least two of the four hollow members being formed from differing materials;

(b) forming the four hollow members into predetermined shapes;

(c) disposing the front ends of the left and right side members in a telescoping relationship with the rearwardly extending protrusions on the front end member and the rear ends of the left and right side members in a telescoping relationship with the forwardly extending protrusions on the rear end member;

(d) securing the telescoping portions of the four hollow members together to form an engine cradle;

(e) providing a vehicular body and frame assembly; and (f) securing portions of the engine cradle to portions of the vehicular body and frame assembly to form a combined engine cradle and vehicular body and frame assembly.

2. The method defined in claim 1 wherein said step (a) is performed by selecting the desired materials from the group of steel, aluminum, magnesium, and composites.

3. The method defined in claim 1 wherein said step (a) is performed by providing each of the four hollow members from differing materials.

4. The method defined in claim 1 wherein said step (b) is performed by hydroforming.

5. The method defined in claim 1 wherein said step (c) is performed by forming protrusions on some of the four hollow members and by disposing end portions of the other of the four hollow members in a telescoping relationship with the protrusions.

6. The method defined in claim 5 wherein said step (c) is performed by forming a pair of protrusions each of a first pair of the four hollow members and by disposing end portions of a second pair of the four hollow members in a telescoping relationship with the protrusions.

7. The method defined in claim 1 wherein said step (d) is performed by laser welding.

8. The method defined in claim 1 wherein said step (d) is performed by MIG welding.

9. The method defined in claim 1 wherein said step (d) is performed by electromagnetic pulse welding.

10. The method defined in claim 1 wherein said step (d) is performed by adhesive bonding.

11. The method defined in claim 1 wherein said step (b) is performed by forming a mounting pad integrally with at least one of the four hollow members.

\* \* \* \* \*